United States Patent
Abe (10) Patent No.: US 9,082,161 B2
(45) Date of Patent: Jul. 14, 2015

(54) IMAGE PROCESSING APPARATUS, IMAGE PROCESSING METHOD, AND NON-TRANSITORY COMPUTER READABLE MEDIUM

(71) Applicant: Canon Kabushiki Kaisha, Tokyo (JP)

(72) Inventor: Noboru Abe, Kawasaki (JP)

(73) Assignee: CANON KABUSHIKI KAISHA (JP)

( * ) Notice: Subject to any disclaimer, the term of this patent is extended or adjusted under 35 U.S.C. 154(b) by 0 days.

(21) Appl. No.: 14/178,423

(22) Filed: Feb. 12, 2014

(65) Prior Publication Data
US 2014/0233046 A1 Aug. 21, 2014

(30) Foreign Application Priority Data
Feb. 21, 2013 (JP) ................................. 2013-032444

(51) Int. Cl.
*H04N 1/405* (2006.01)
*G06T 5/00* (2006.01)
*G06T 3/40* (2006.01)

(52) U.S. Cl.
CPC ................. *G06T 5/00* (2013.01); *G06T 3/4007* (2013.01); *G06T 5/005* (2013.01); *G06T 2207/30176* (2013.01)

(58) Field of Classification Search
CPC ... H04N 1/40068; H04N 1/4092; H04N 1/40; H04N 1/40075; H04N 1/09
USPC ................. 358/1.1, 3.06–3.09, 468, 448, 1.2; 382/298–300, 148
See application file for complete search history.

(56) References Cited

U.S. PATENT DOCUMENTS

| 5,231,519 | A | * | 7/1993 | Koike | ........................... 358/3.07 |
| 5,689,289 | A | * | 11/1997 | Watanabe et al. | .................. 347/7 |
| 6,111,656 | A | * | 8/2000 | Nohata et al. | ................... 358/1.2 |

FOREIGN PATENT DOCUMENTS

| JP | 2011-254271 A | 12/2011 |
| JP | 2012-084993 A | 4/2012 |

* cited by examiner

*Primary Examiner* — Thomas D Lee
*Assistant Examiner* — Stephen M Brinich
(74) *Attorney, Agent, or Firm* — Rossi, Kimms & McDowell LLP (57) ABSTRACT

An image processing apparatus comprises: a decision unit which decides, based on a first resolution and a second resolution, a sampling pixel to be used for resolution conversion in the first image data; a determination unit which determines whether the first image data includes a white line of not larger than a predetermined width; a replacing unit which, in a case where a pixel of interest in the first image data is a pixel included in the white line and is not the sampling pixel, replaces a value of the pixel of interest with a value of a pixel adjacent to the pixel of interest; and a conversion unit which converts the first image data including the replaced value of the pixel into the second image data having the second resolution.

9 Claims, 12 Drawing Sheets

| 0.67 | 0.67 | 0.67 | 0.67 | 0.67 | 0.67 | 0.67 | 0.67 | 0.67 | 0.67 | ~1100 |
|---|---|---|---|---|---|---|---|---|---|---|
| 0 | 0 | 0 | 0 | 0 | 0 | 0 | 0 | 0 | 0 | |
| 0 | 0 | 0 | 0 | 0 | 0 | 0 | 0 | 0 | 0 | |
| 0.33 | 0.33 | 0.33 | 0.33 | 0.33 | 0.33 | 0.33 | 0.33 | 0.33 | 0.33 | |
| 0.33 | 0.33 | 0.33 | 0.33 | 0.33 | 0.33 | 0.33 | 0.33 | 0.33 | 0.33 | |
| 0 | 0 | 0 | 0 | 0 | 0 | 0 | 0 | 0 | 0 | |
| 0 | 0 | 0 | 0 | 0 | 0 | 0 | 0 | 0 | 0 | |
| 0 | 0 | 0 | 0 | 0 | 0 | 0 | 0 | 0 | 0 | |

FIG. 14A

| 5 | 10 | 0 |
|---|---|---|

FIG. 14B

| 0 | 10 | 5 |
|---|---|---|

IMAGE PROCESSING APPARATUS, IMAGE PROCESSING METHOD, AND NON-TRANSITORY COMPUTER READABLE MEDIUM

BACKGROUND OF THE INVENTION

1. Field of the Invention

The present invention relates to an image processing apparatus, image processing method, and non-transitory computer readable medium. Particularly, the present invention relates to a technique of performing exposure control processing for a white thin line on a black background in resolution conversion processing for outputting a high-resolution binary image signal from a low-resolution image output apparatus.

2. Description of the Related Art

When an image processing apparatus such as a printer, copying machine, or MFP (Multi Function Peripheral) prints an outline character, the white thin line sometimes becomes thinner or is disconnected by the background color. In particular, it may become difficult to read a small-size outline character.

There has conventionally been proposed a method of performing expansion processing for a white thin line part when a white thin line exists on a black background. In Japanese Patent Laid-Open No. 2011-254271, an image processing apparatus includes a detection unit which detects a character edge based on tag data representing the attribute of image data, and a determination unit which determines whether the character edge is the outer edge part of an outline character. Expansion processing is performed for a character whose character edge is determined to be the outer edge of an outline character.

In Japanese Patent Laid-Open No. 2012-84993, when priority is given to the reproducibility of a white thin line, a tone value at which the thickness of a white thin line in a dot screen corresponding to a tone value becomes smaller than a minimum line width reproducible when attention is paid to the thickness of a white thin line in an image forming apparatus is set as a threshold in the region of low tone values. If the tone value of an input image exceeds the threshold, the dot screen is switched to a line screen. In the region of high tone values, a tone value at which the thickness of a white thin line in a line screen corresponding to a tone value becomes smaller than a reproducible minimum line width is set as a threshold. If the tone value of an input image exceeds the threshold, the line screen is switched to an outline dot screen.

There has conventionally been proposed an arrangement in which a low-resolution image output apparatus outputs a high-resolution image signal as high-resolution image data in image processing by a printer, copying machine, MFP, or the like.

When converting the resolution of the first image data having a first resolution N into the second image data having a second resolution M lower than N, the resolution conversion ratio may not be an integer multiple. In this case, if a white thin line is emphasized by the conventional arrangement, the thickness of the white thin line sometimes changes upon outputting the second image data, depending on the position of the white thin line in the first image data.

In some cases, the resolution of the second image data after resolution conversion is different between the main scanning direction and the sub-scanning direction. In this case, if a white thin line is emphasized by the above arrangement, the thickness of a white thin line may differ between the main scanning direction and the sub-scanning direction upon outputting the second image data.

SUMMARY OF THE INVENTION

According to one aspect of the present invention, there is provided an image processing apparatus which converts first image data having a first resolution into second image data having a second resolution lower than the first resolution, comprising: a decision unit configured to decide, based on the first resolution and the second resolution, a sampling pixel to be used for resolution conversion in the first image data; a determination unit configured to determine whether the first image data includes a white line of not larger than a predetermined width; a replacing unit configured to, in a case where a pixel of interest in the first image data is a pixel included in the white line and is not the sampling pixel, replace a value of the pixel of interest with a value of a pixel adjacent to the pixel of interest; and a conversion unit configured to convert the first image data including the replaced value of the pixel into the second image data having the second resolution.

According to another aspect of the present invention, there is provided an image processing method of converting first image data having a first resolution into second image data having a second resolution lower than the first resolution, comprising: deciding, based on the first resolution and the second resolution, a sampling pixel to be used for resolution conversion in the first image data; determining whether the first image data includes a white line of not larger than a predetermined width; replacing, in a case where a pixel of interest in the first image data is a pixel included in the white line and is not the sampling pixel, a value of the pixel of interest with a value of a pixel adjacent to the pixel of interest; and converting first image data including the replaced value of the pixel into second image data having the second resolution.

According to another aspect of the present invention, there is provided a non-transitory computer readable medium storing a program for causing a computer to function as: a decision unit configured to, in a case where performing resolution conversion from a first resolution of first image data into second image data having a second resolution lower than the first resolution, decide a sampling pixel in the first image data based on the first resolution and the second resolution; a determination unit configured to determine whether the first image data includes a white line of not larger than a predetermined width; a replacing unit configured to, in a case where a pixel of interest in the first image data is a pixel included in the white line and is not the sampling pixel, replace a value of the pixel of interest with a value of a pixel adjacent to the pixel of interest; and a conversion unit configured to convert first image data including the replaced value of the pixel into second image data having the second resolution.

The thickness of a stable white thin line can be reproduced in an image processing apparatus which converts the first binary image data having a first resolution N into the second multi-valued image data having a second resolution M lower than the first resolution and outputs the second multi-valued image data.

Further features of the present invention will become apparent from the following description of exemplary embodiments (with reference to the attached drawings).

DESCRIPTION OF THE EMBODIMENTS

Embodiments of the present invention will now be described with reference to the accompanying drawings. The present invention is directed to white thin line emphasis in an image processing apparatus which converts the first image data having a first resolution N into the second image data having a second resolution M lower than the first resolution N.

[Apparatus Arrangement]

Figure 1:
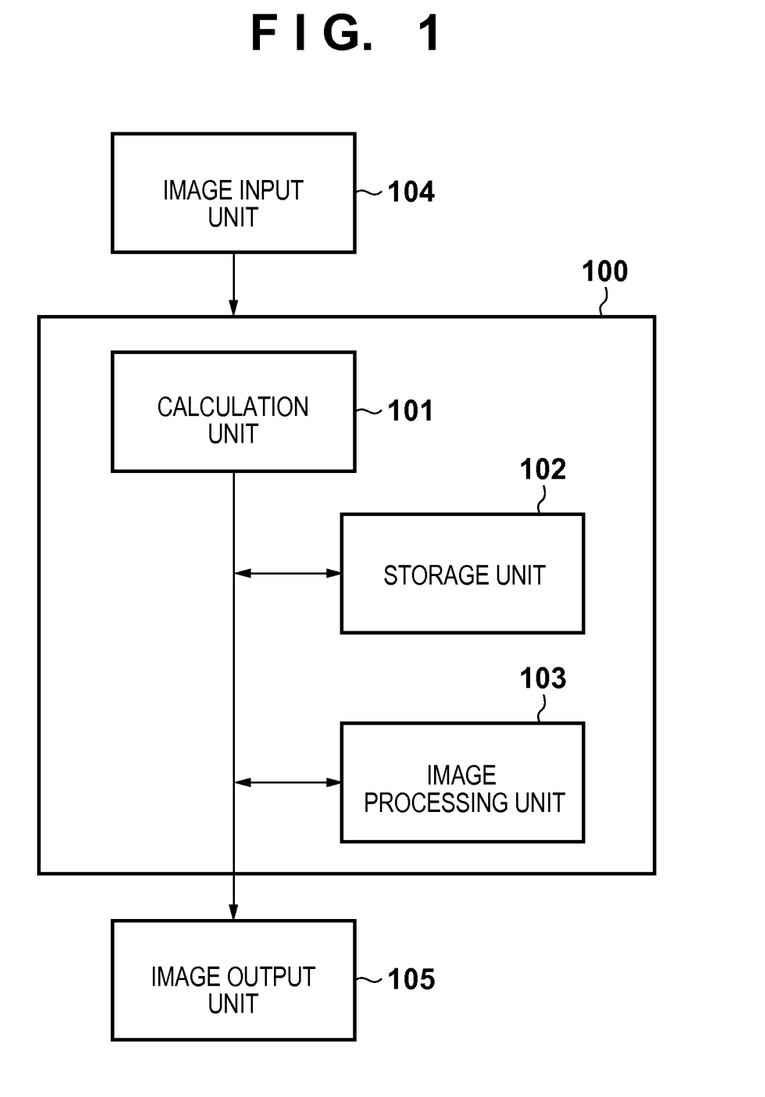
FIG. 1 is a block diagram showing the conceptual arrangement of a control system in an image processing apparatus.

FIG. 1 is a block diagram showing the conceptual arrangement of a control system in an image processing apparatus according to an embodiment of the present invention. In FIG. 1, a control unit 100 controls the overall image processing apparatus. The control unit 100 includes a calculation unit 101, storage unit 102, and image processing unit 103. The calculation unit 101 executes various processing operations such as calculation, control, and discrimination. The storage unit 102 stores a resolution conversion processing program, resolution conversion processing filter, and the like (to be described later). The image processing unit 103 executes resolution conversion processing (to be described later).

Image data to undergo resolution conversion processing is input from an image input unit 104 to the control unit 100. In the embodiment of the present invention, a unit for acquiring image data by the image processing apparatus is arbitrary. For example, the image input unit 104 may acquire image data created by the user on a predetermined application. When the image processing apparatus includes a reading device (not shown) for a detachable medium such as an optical disk or USB storage device, image data may be input via the medium. Further, when the image processing apparatus is connected to an external apparatus via a network (not shown), the image input unit 104 may acquire image data via the network.

The image data having undergone image processing by the control unit 100 is transferred to an image output unit 105. In the embodiment of the present invention, the control unit 100 is implemented by a program which is executed by the CPU of the MFP or printer. The control unit 100 may be arranged in a PC (not shown) connected to the MFP or printer by a network, USB cable, or the like. In the embodiment of the present invention, the image output unit 105 is an electrophotographic printer unit.

First Embodiment

The first embodiment assumes that a first resolution N serving as a resolution before resolution conversion is 600 dpi in the main scanning direction and 600 dpi in the sub-scanning direction. Also, assume that a second resolution M serving as a resolution after resolution conversion is 600 dpi in the main scanning direction and 400 dpi in the sub-scanning direction (to be referred to as 600×400 dpi hereinafter). Here, N and M are integers. That is, in some cases, the resolution conversion ratio before and after resolution conversion processing may not be an integer multiple. Assume that both the first image data and second image data are monochrome image data. In the embodiment, the first image data is binary image data having undergone dither processing, and the second image data is 8-bit multi-valued image data.

The first embodiment will explain white thin line emphasis processing in resolution conversion processing of converting the first image data having the first resolution N into the second image data having the second resolution M. Note that the embodiment will explain an example in which only the resolution in the sub-scanning direction is converted without converting the resolution in the main scanning direction (resolution conversion from 600 dpi into 400 dpi in the sub-scanning direction). Substantially, two of every three lines in the sub-scanning direction are sampled from the first image data, decreasing the number of pixels of the second image data in the sub-scanning direction to be ⅔ of the first image data. However, one of three pixels is not simply thinned out in the embodiment.

[Resolution Conversion Processing]

Figure 4A:
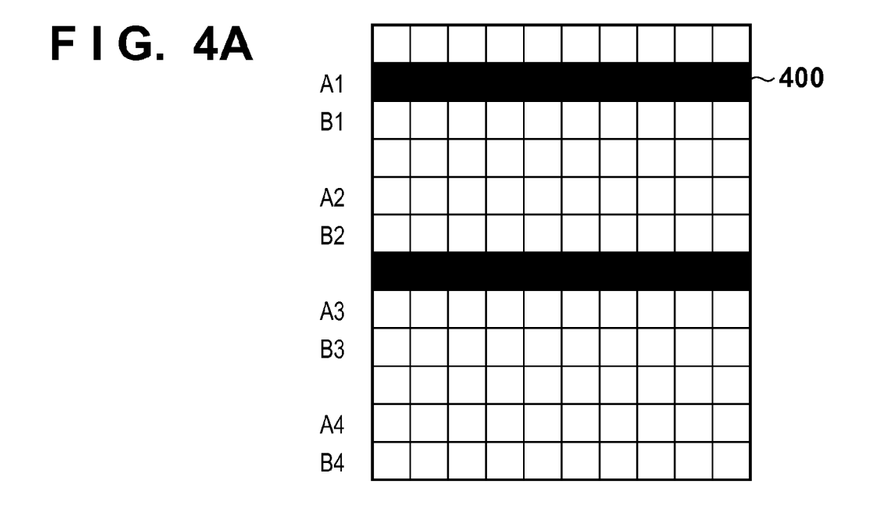
FIGS. 4A, 4B, and 4C are views for explaining input binary image data and output multi-valued image data.
Figure 4B:
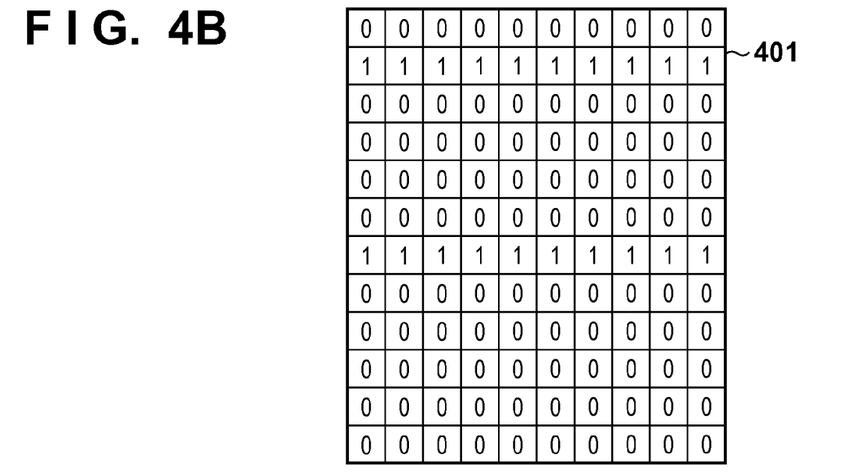
Figure 4C:
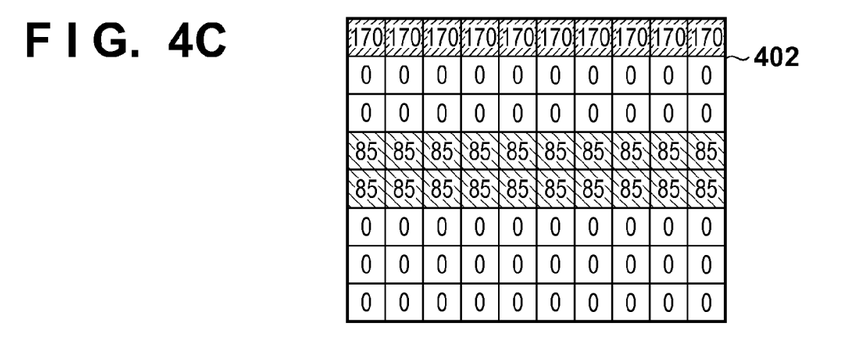

FIGS. 4A to 4C are views for conceptually explaining resolution conversion processing of converting the first image data into the second image data. FIG. 4A is a partially enlarged view of the first image data having the first resolution N. FIG. 4B shows pixels values in FIG. 4A. FIG. 4C shows the second image data obtained by performing resolution conversion processing according to the embodiment for the first image data. The second image data is 8-bit multi-valued image data, as described above, and an output value is clipped using a minimum value of 0 and a maximum value of 255.

Reference signs A1 to A3 and B1 to B3 in the sub-scanning direction shown in FIG. 4A are lines (to be referred to as lines A1 to A3 and lines B1 to B3 hereinafter) which are sampled from the first image data when performing resolution conversion processing. In the embodiment, two of every three lines are sampled, as described above. A line not to undergo sampling is adjacent above to the line A. In contrast, a line not to undergo sampling is adjacent below to the line B. That is, the lines A and B are different in the positional relationship with a line not to undergo sampling.

Figure 5A:
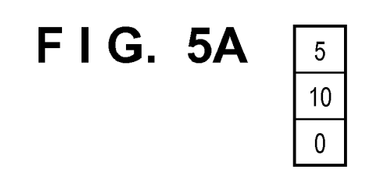
FIGS. 5A and 5B are views showing examples of resolution conversion processing filters in the sub-scanning direction.
Figure 5B:
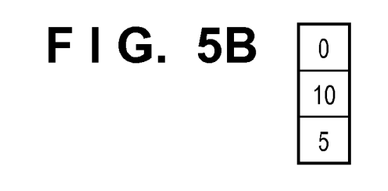

The embodiment adopts a plurality of resolution conversion processing filters for performing resolution conversion processing. FIGS. 5A and 5B show examples of the resolution conversion processing filters. FIG. 5A shows an example which defines a resolution conversion processing filter (to be referred to as a filter A hereinafter) to be used for pixels of interest on the lines A1 to A3. FIG. 5B shows an example which defines a resolution conversion processing filter (to be referred to as a filter B hereinafter) to be used for pixels of interest on the lines B1 to B3. A value in the filter is a weight coefficient (to be referred to as a filter coefficient hereinafter) to a pixel value. A filter coefficient at the center position of a filter is used to correspond to a pixel of interest.

The first image data is binary image data. "1" is set at a portion filled in black in FIG. 4A, and "0" is set at a blank portion. A product-sum operation is executed using the filters for all pixels on the lines A1 to A3 and the lines B1 to B3. In image data, i indicates a coordinate in the main scanning direction, and j indicates a coordinate in the sub-scanning direction. Letting x(i, j) be the value of the pixel of interest in in the first image data, the calculation result of filter processing by the filter A is given by:

OUT=(5*x(i,j−1))+(10*x(i,j))+(0*x(i,j+1))

where "*" is the product. The range of pixels to undergo the product-sum operation is decided in accordance with the filter size.

A value obtained by clipping this calculation result to an 8-bit output (maximum value of 255) at the ratio of the calculation result to the total sum of the filter coefficients serves as an output value. The total sum of the filter coefficients of the filter A is 15 (=5+10+0). This also applies to the filter B. As a result, in the embodiment, the output value of the calculation result of filter processing takes four values of 0 (=255*0/15), 85 (=255*5/15), 170 (=255*10/15), and 255 (=255*15/15). This processing will be referred to as "clipping an output value" hereinafter.

[Dot Formation]

Figure 6:
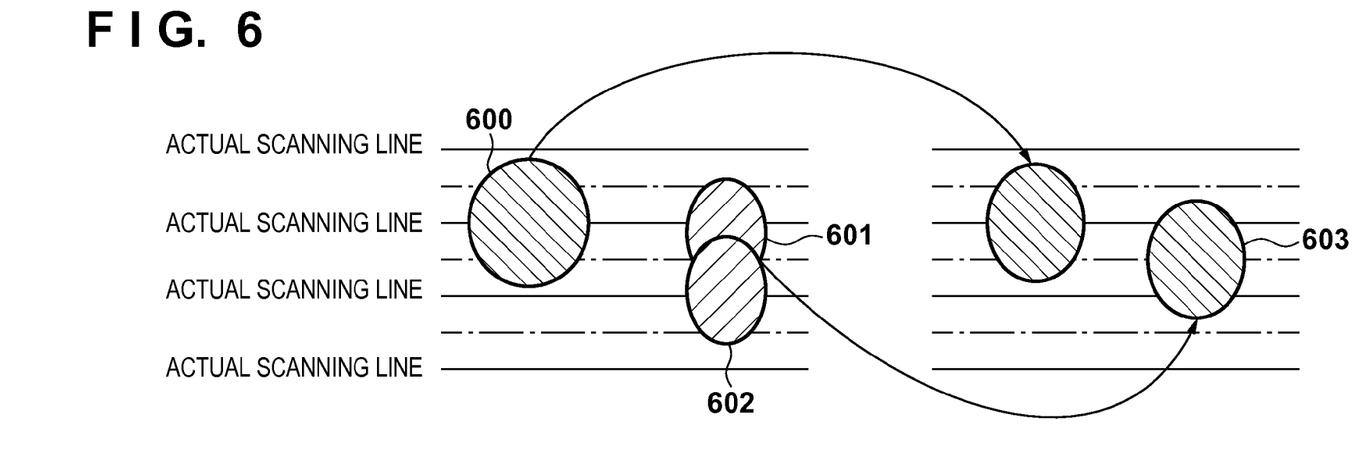
FIG. 6 is a view showing the concept of sub-dot formation by overlay of exposure.

FIG. 6 shows a sub-dot formation principle between dots by overlay of laser exposure. Exposure of a half dot is overlaid on upper and lower pixels 601 and 602 on actual scanning lines indicated by solid lines, forming a dot 603 between the actual scanning lines. The embodiment exploits this principle.

In FIG. 4C showing the second image data, pixels having an output value of 85 are aligned above and below on the fourth and fifth lines counted from the top. In a printout, dots are formed between the actual scanning lines of these pixels aligned above and below to complement thinned-out pixels, implementing a resolution of 600 dpi.

The exposure amount of laser exposure can be adjusted by PWM (Pulse Width Modulation) control in an image output unit 105. The output value of the second image data represents the ratio of the engine resolution and PWM pulse width. That is, an output value of 255 indicates full exposure of one pixel by a 600×400-resolution engine. An output value of 85 indicates exposure at a ⅓ width, and along with this, the exposure amount also becomes ⅓. By deciding the coefficient of the resolution conversion processing filter, an exposure amount using PWM control is also decided.

However, in electrophotography, a dot to be actually printed does not linearly greatly change even by increasing the PWM pulse width owing to overlay of laser exposure and gathering of potential peaks. Ideally, the filter coefficient and PWM pulse width are linearly clipped, as described above. However, the coefficient may be arbitrarily adjusted in accordance with the engine characteristic and output result of the printer.

The value of the filter coefficient needs to be set so that the ratio of each of the following two values to the total sum of filter coefficients forming a 1-resolution conversion filter becomes equal to the inverse number M/N of the resolution conversion ratio N/M:

(1) a filter coefficient regarding the value of a sampling point (pixel)

(2) the total sum of filter coefficients regarding the values of non-sampling points (pixels)

Note that the embodiment uses a plurality of resolution conversion processing filters (filters A and B). (2) is the total sum of the filter coefficients of the plurality of resolution conversion processing filters.

The filter coefficient of the resolution conversion processing filter is defined in the above-described way because the PWM intensity needs to be weakened in accordance with the resolution conversion ratio in order to convert the resolution of 400 dpi into the resolution of 600 dpi in the sub-scanning direction. In the embodiment, the inverse number M/N of the resolution conversion ratio N/M is 400/600=⅔.

The filter coefficients shown in FIGS. 5A and 5B in the embodiment will be exemplified. (1) becomes "10" which is a filter coefficient regarding pixels of interest in the filters A and B. (2) becomes the total sum of "5" in the filter A and "5" in the filter B which are filter coefficients regarding pixels (non-sampling points) to be complemented. More specifically, a line (seventh line from the top) interposed between the lines B2 and A3 from above and below in FIG. 4A is formed from points not to undergo sampling (non-sampling points). When the resolution conversion filters are applied to, as pixels of interest, two points (sampling points on the lines B2 and A3) sandwiching this non-sampling point from above and below, each filter coefficient "5" is applied to the non-sampling point. As a result, the total sum becomes 10 (=5+5).

Since the total sum of these filter coefficients is 15 (=10+5+0) from (1), the ratio of each of (1) and (2) to the total sum of the filter coefficients becomes 10/15=⅔. Hence, the above-described resolution conversion processing filter condition is satisfied.

[Processing Sequence]

The procedures of resolution conversion processing and white thin line emphasis processing according to the embodiment will be explained with reference to the flowcharts of FIGS. 2 and 3.

In step S201, a control unit 100 acquires multi-valued image data having the resolution N from an image input unit 104, and stores it in a storage unit 102. In step S202, an image processing unit 103 executes image processes such as density adjustment and gamma correction for the input multi-valued image data. In step S203, the image processing unit 103 performs dither processing using a predetermined dither pattern, thereby converting the multi-valued image data into binary image data 400.

In step S204, the image processing unit 103 executes white thin line emphasis determination processing according to the embodiment for the binary image data 400. In accordance with the determination result, the image processing unit 103 executes white thin line emphasis processing (step S318) for the binary image data 400. After that, the image processing unit 103 executes resolution conversion processing for the binary image data 400, thereby converting the binary image data 400 into multi-valued image data 402 having the resolution M. In accordance with the result of the white thin line determination processing, the image processing unit 103 executes white thin line emphasis processing (step S307) for the multi-valued image data 402. The resolution conversion processing will be described later.

In step S205, the image processing unit 103 executes image processing for the multi-valued image data 402 having undergone resolution conversion processing. In step S206, the image processing unit 103 transfers the multi-valued image data to the image output unit 105. The image output unit 105 performs print processing by using the multi-valued image data acquired from the image processing unit 103.

(White Thin Line Emphasis Processing and Resolution Conversion Processing)

Figure 2:
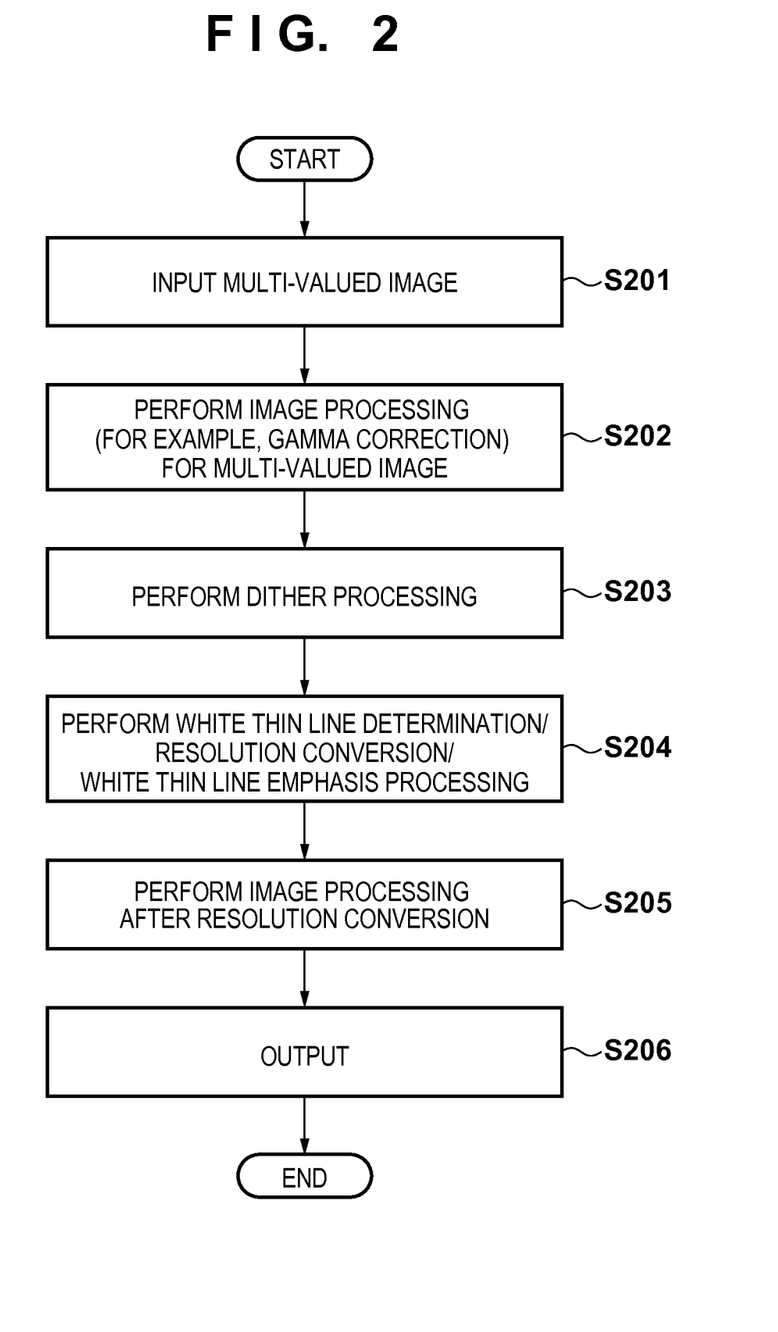
FIG. 2 is a flowchart showing the procedures of resolution conversion processing and white thin line emphasis processing according to the embodiment.
Figure 3A:
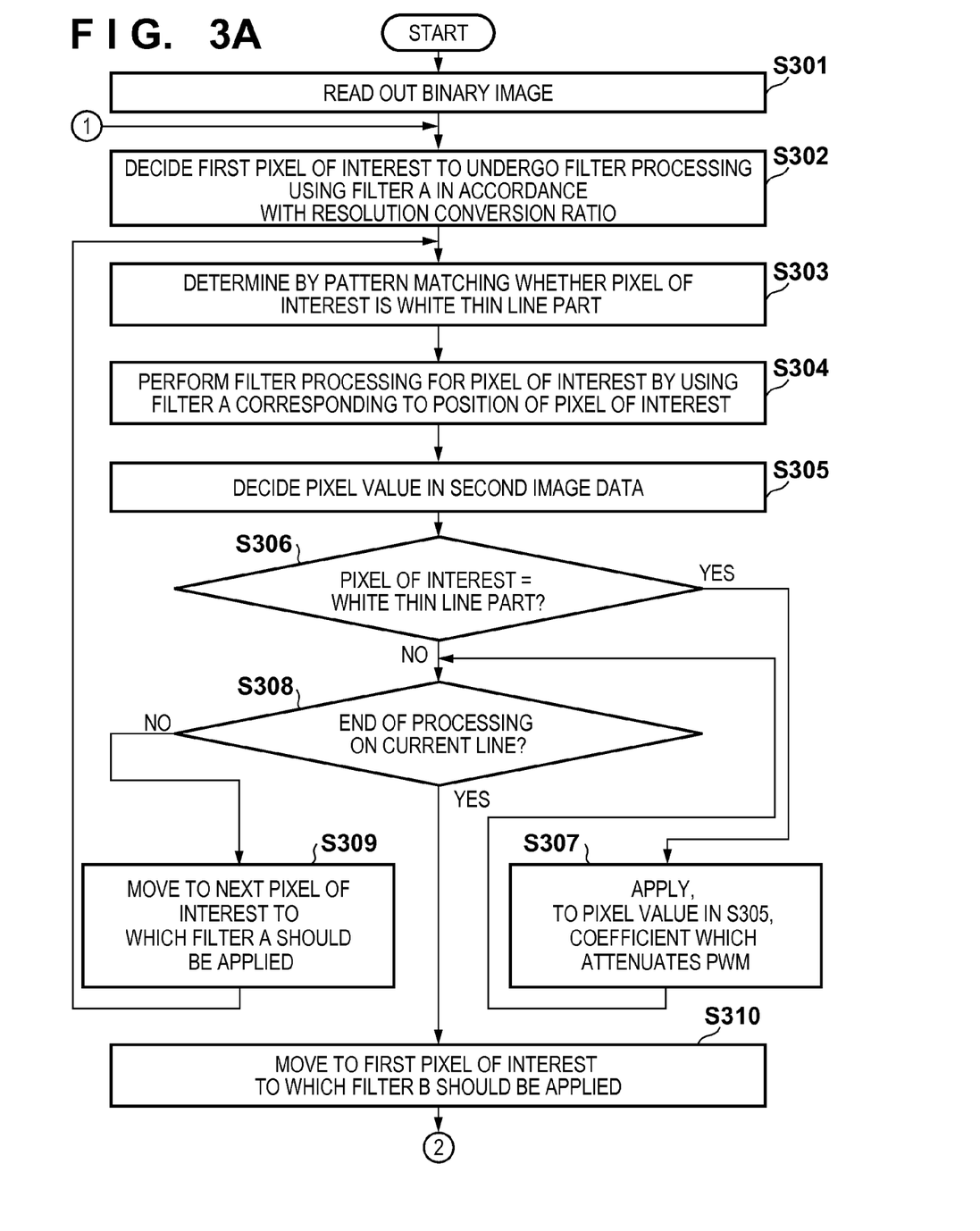
FIGS. 3A and 3B are flowcharts showing detailed processing procedures in step S204 shown in FIG. 2.
Figure 3B:
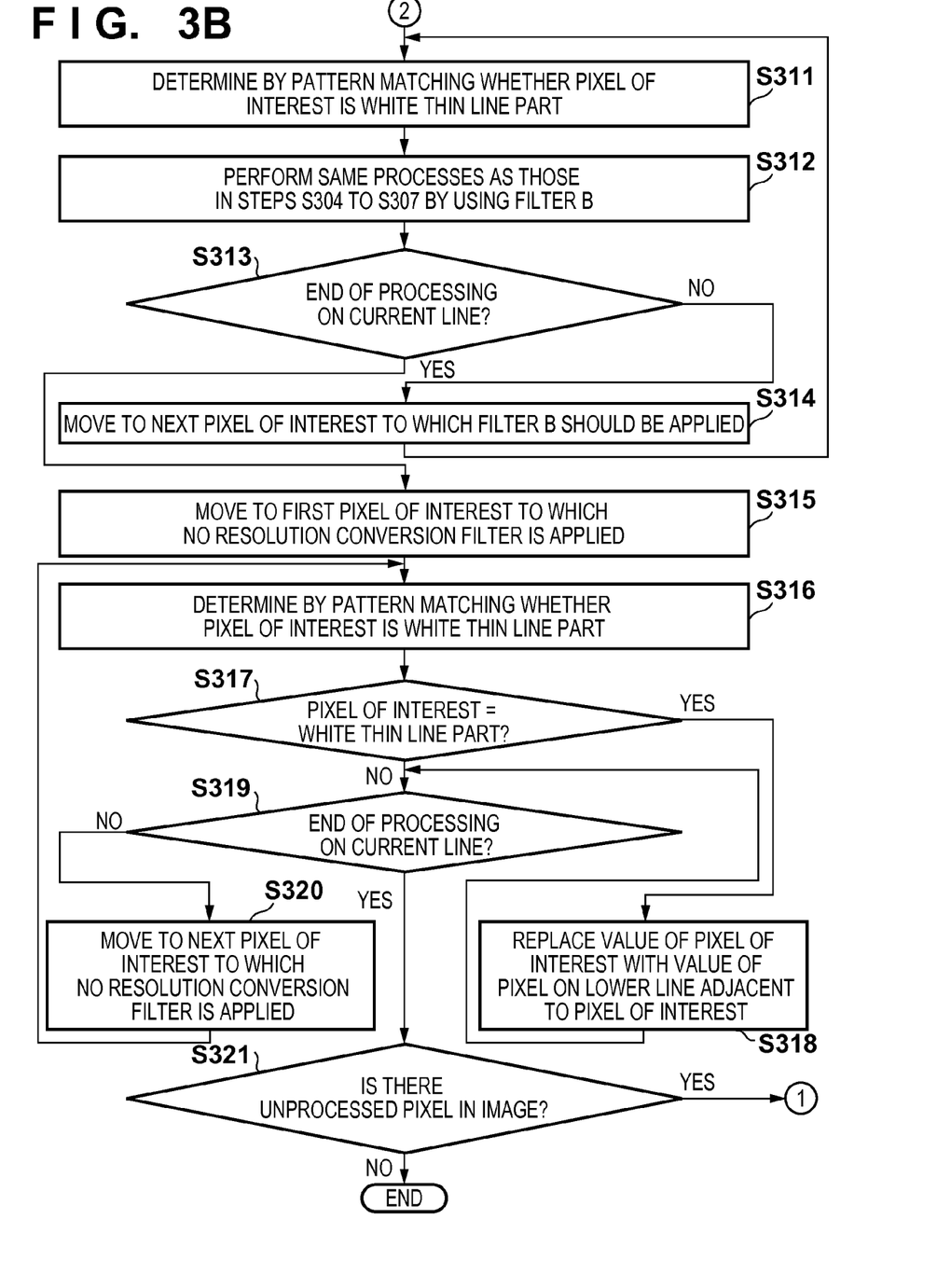

FIGS. 3A and 3B are flowcharts showing details of the white thin line emphasis processing and resolution conversion processing in step S204 of FIG. 2.

In step S301, the image processing unit 103 reads out the binary image data 400. In step S302, the image processing unit 103 decides, in accordance with the ratio of the first resolution N to the second resolution M, the first pixel of interest for which filter processing in resolution conversion processing starts. The first pixel of interest in this step is the first pixel of the line A1 in FIG. 4A, and is a pixel at the left end of the line A1.

Figure 7:
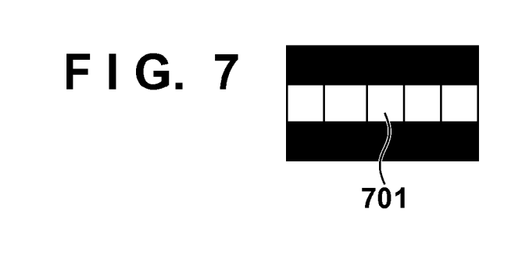
FIG. 7 is a view showing an example of a template pattern for pattern matching.

In step S303, the image processing unit 103 performs pattern matching using a window (pixel pattern) having a size of I×J pixels surrounding the pixel of interest serving as the center, and determines whether the pixel of interest is a white thin line part. In this case, the window size is 5×3 pixels. Note that a pixel pattern of another size is also usable. FIG. 7 shows an example of a 5×3-size white thin line determination pattern surrounding a pixel 701 of interest serving as the center. When the neighboring pixels surrounding the pixel of interest match the pattern in FIG. 7, it is determined that the pixel of interest is a white thin line part. The embodiment uses a window for determining a pixel having a black value as a background color, and a pixel having a white value sandwiched by pixels of the background color as a white thin line part.

Figure 8A:
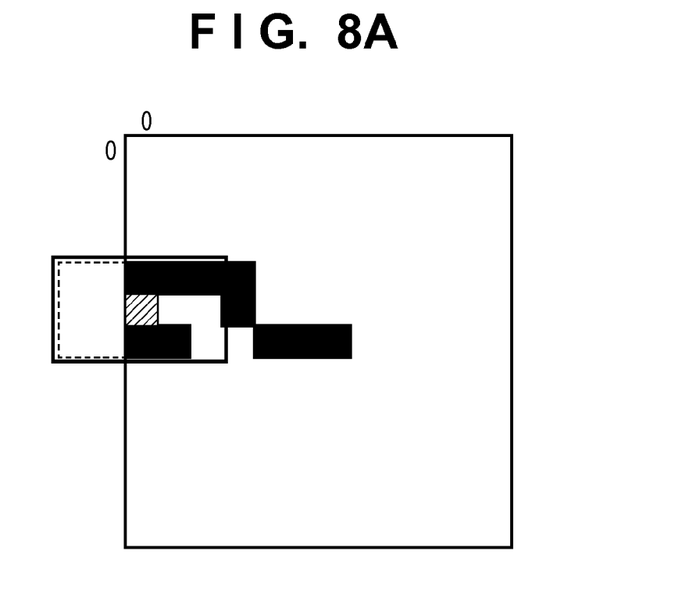
FIGS. 8A and 8B are views showing an example of processing when the pixel of interest exists at the end of an image.
Figure 8B:
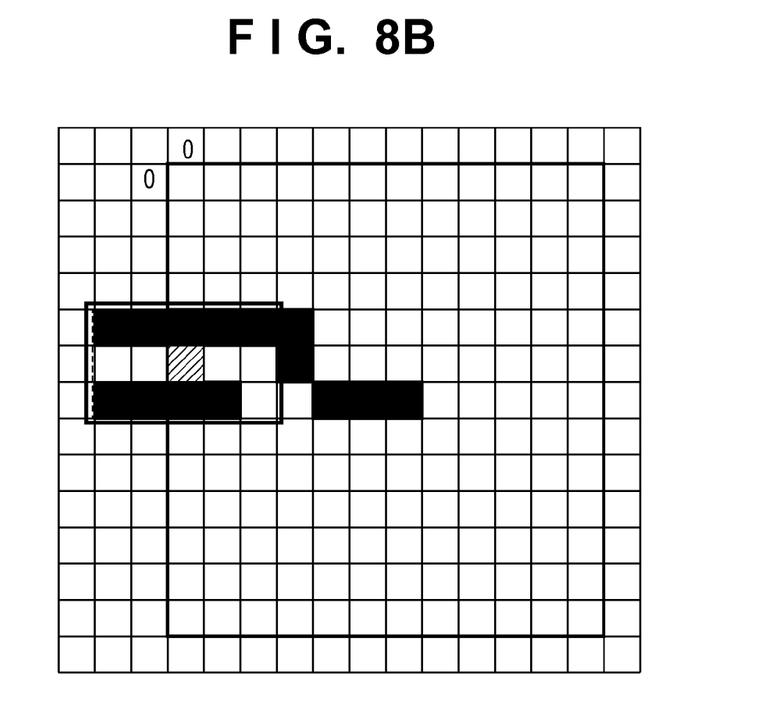

A case in which the pixel of interest exists at the end of an image in either or both of the main scanning direction and sub-scanning direction will be explained with reference to FIGS. 8A and 8B. In FIGS. 8A and 8B, the upper left corner of an image is defined as an origin (0, 0). For example, assume that the position of the pixel of interest is (0, 5), as shown in FIG. 8A. In this case, matching may be performed on the assumption that a part on the left side of the pixel of interest is padded with a pixel value "0", as shown in FIG. 8A. Alternatively, matching may be performed on the assumption that the left part is padded with pixel values so that the pixel value of the binary image data 400 is turned back at the left end, as shown in FIG. 8B. Another arbitrary method is also available.

In step S304, the image processing unit 103 executes the product-sum operation for the first pixel of interest by using the filter A corresponding to filter processing for the first pixel of interest. In step S305, the image processing unit 103 clips the output result of the product-sum operation to 8 bits which are output bits of the second image data. Accordingly, the pixel value of the pixel of interest in the second image data is decided.

In step S306, the image processing unit 103 determines whether it has been determined in step S303 that the pixel of interest is a white thin line part. If the pixel of interest is a white thin line part (YES in step S306), the process advances to step S307. If the pixel of interest is not a white thin line part (NO in step S306), the process advances to step S308.

In step S307, the image processing unit 103 adjusts the PWM intensity by applying a coefficient to the pixel value clipped to 8 bits in steps S304 and S305. Theoretically, the coefficient is adjusted so that the PWM intensity becomes equal to that of a white thin line in the sub-scanning direction. However, the coefficient can be changed in accordance with the engine characteristics and the degree of emphasis of a white thin line. Hence, white thin line emphasis can be performed at a sampling point. The process then advances to step S308.

In step S308, the image processing unit 103 determines whether a pixel to undergo the product-sum operation using the filter A remains on the same line as that of the pixel of interest. If an unprocessed pixel remains (NO in step S308), the process advances to step S309. If no unprocessed pixel remains (YES in step S308), the process advances to step S310. In step S309, the image processing unit 103 sets, as the pixel of interest, the next pixel to undergo the product-sum operation. Then, the process returns to step S303.

In step S310, the image processing unit 103 shifts the pixel of interest to the pixel to undergo the product-sum operation using the filter B. In the embodiment, a pixel at the start (left end) of a line next to the line on which the pixel of interest has existed serves as the pixel of interest.

In steps S311 to S314, the image processing unit 103 performs the same processes as those in steps S304 to S307 by using the filter B. In step S313, the image processing unit 103 determines whether a pixel to undergo the product-sum operation using the filter B remains on the line on which the pixel of interest exists. If no unprocessed pixel remains (YES in step S313), the process shifts to step S315.

In step S315, the image processing unit 103 shifts the pixel of interest in the binary image data 400 to the first pixel (non-sampling point) in which no resolution conversion processing filter is used. In the embodiment, a pixel at the start (left end) of a line next to the line on which the pixel to undergo the product-sum operation using the filter B exists serves as the pixel of interest.

In step S316, similar to step S303, the image processing unit 103 performs white thin line part determination for the pixel of interest. In step S317, the image processing unit 103 determines whether it has been determined in step S316 that the pixel of interest is a white thin line part. If the pixel of interest is a white thin line part (YES in step S317), the process advances to step S318. If the pixel of interest is not a white thin line part (NO in step S317), the process advances to step S319.

Figure 9A:
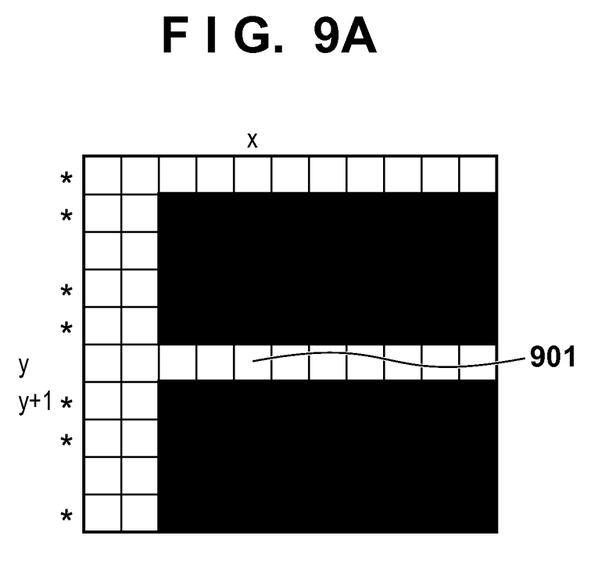
FIGS. 9A and 9B are views showing an example of white thin line emphasis processing at a non-sampling point.
Figure 9B:
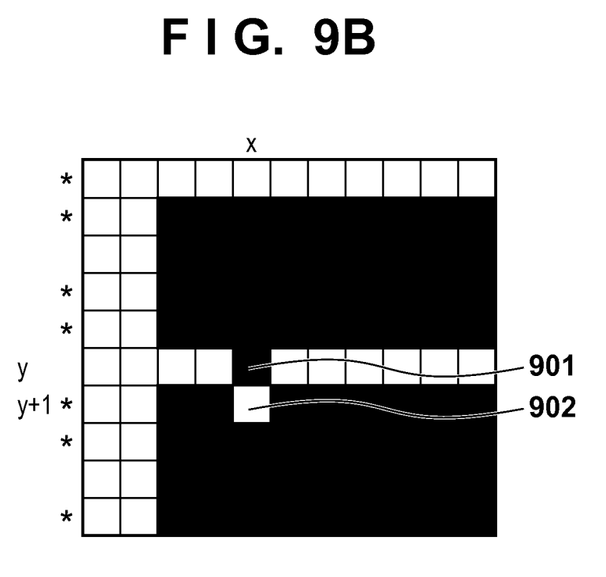

In step S318, the image processing unit 103 performs white thin line emphasis processing for the pixel of interest. White thin line part emphasis processing at a non-sampling point in step S318 will be explained with reference to FIGS. 9A and 9B. As shown in FIG. 9A, (x, y) is the coordinate point of a pixel 901 of interest serving as a non-sampling point in the binary image data 400. When it is determined that the pixel of interest is a white thin line part, the value of the pixel 901 of interest and that of a pixel 902 on the next line positioned at (x, y+1) in the binary image data 400 are replaced, as shown in FIG. 9B. Then, the process advances to step S319.

After pixels are replaced in step S318, a coefficient which attenuates PWM may be applied to the pixel 902 adjacent to the replaced pixel 901 of interest. If YES is determined in step S317, a coefficient which attenuates PWM may be applied to the pixel 902 to perform PWM control in the image output unit 105, without replacing the pixel 901 of interest and the pixel 902 on the next line in step S318.

In step S319, the image processing unit 103 determines whether an unprocessed pixel remains on the line on which the pixel of interest exists. If an unprocessed pixel remains (NO in step S319), the process advances to step S320. If no unprocessed pixel remains (YES in step S319), the process advances to step S321. In step S320, the image processing unit 103 sets, as the pixel of interest, the next pixel to which no resolution conversion processing filter is applied. The process then returns to step S316.

In step S321, the image processing unit 103 determines whether there is an unprocessed pixel in the binary image data 400. If there is an unprocessed pixel (YES in step S321), the process returns to step S302, and the image processing unit 103 shifts the pixel of interest to the next pixel to undergo the product-sum operation using the filter A. In the embodiment, a pixel at the start (left end) of a line next to the line on which the non-sampling point exists serves as the pixel of interest. If there is no unprocessed pixel (NO in step S321), the processing sequence ends.

In this manner, the white thin line part determination processing and product-sum operation are performed for all pixels included in the binary image data.

By executing the above-described processing, the first image data 400 having the first resolution of 600 dpi is converted into the second image data 402 having the second resolution of 600×400 dpi. Emphasis processing is applied to a pixel determined to be a white thin line part. At a non-sampling point in the first image data 400, a dot is formed between actual scanning lines by overlay of the sub-dots of upper and lower adjacent sampling points. As a result, a 600-dpi output image can be obtained from an engine having an output resolution of 600×400 dpi.

Figure 10A:
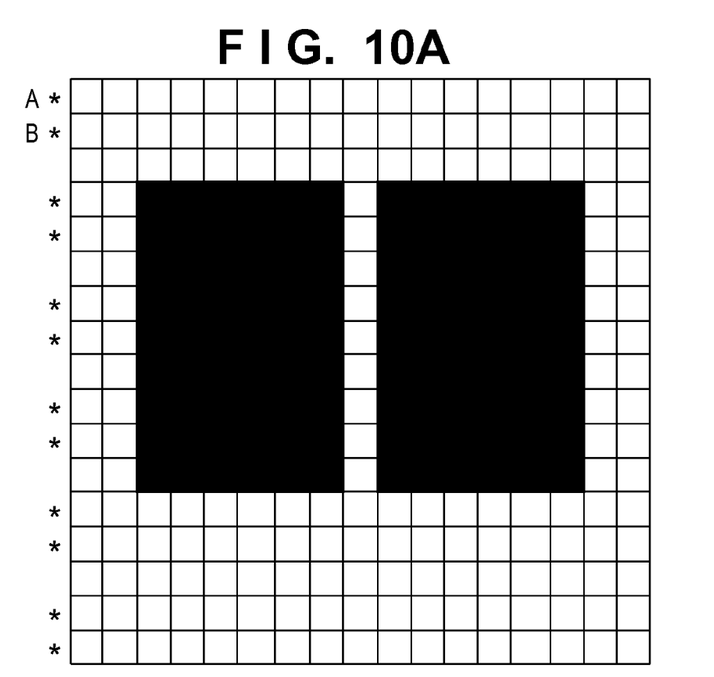
FIGS. 10A and 10B are views for explaining output image data based on the presence/absence of white line emphasis processing.
Figure 10B:
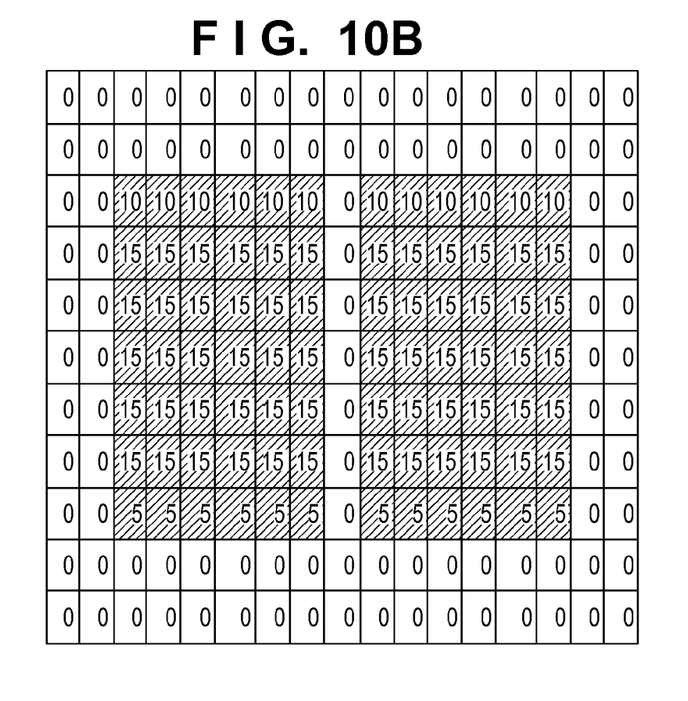

A difference between a case in which the above-described white thin line emphasis processing is performed and a case in which it is not performed will be explained with reference to FIGS. 10A to 12B. FIG. 10A shows binary image data before resolution conversion processing, and shows an example in which a white thin line of a 1-dot width exists in the sub-scanning direction. FIG. 10B shows pixel values obtained by executing resolution conversion processing using the filters A and B shown in FIGS. 5A and 5B for this binary image data. In this case, the 1-dot white thin line in the sub-scanning direction remains in the image data after resolution conversion processing, and is clearly reproduced in an output material from the image output apparatus.

Figure 11A:
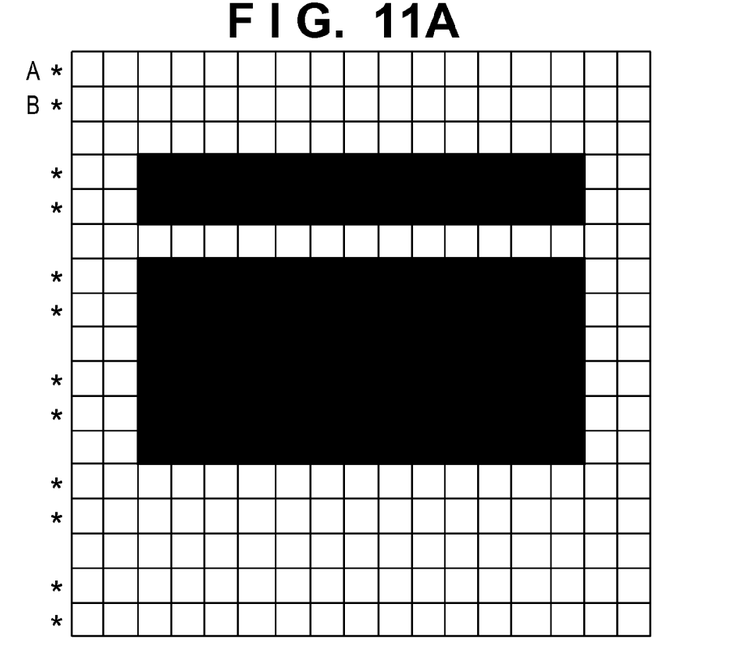
FIGS. 11A and 11B are views for explaining output image data based on the presence/absence of white line emphasis processing.
Figure 11B:
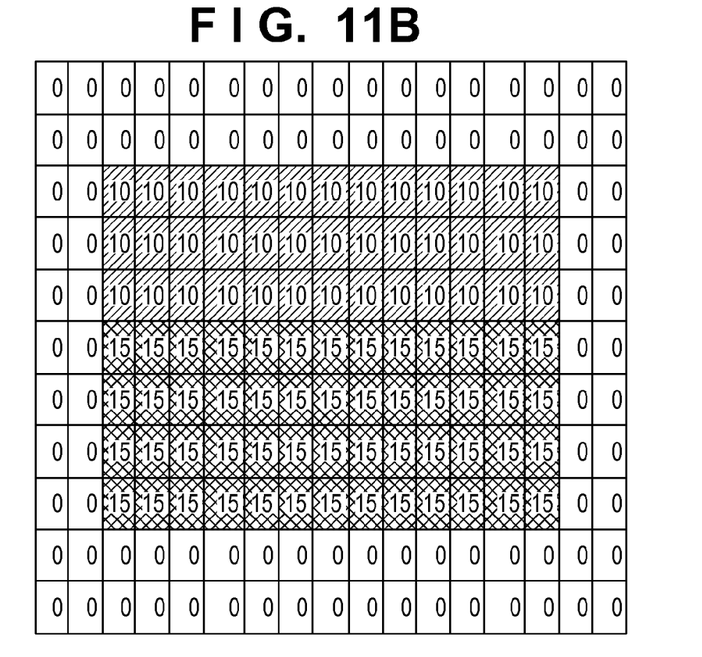

FIG. 11A shows binary image data before resolution conversion processing, and shows an example in which a white thin line of the 1-dot width exists in the main scanning direction. FIG. 11B shows pixel values obtained by executing resolution conversion processing using the filters A and B shown in FIGS. 5A and 5B for this binary image data. In this case, the white thin line part in the main scanning direction does not remain in the image data after resolution conversion processing, and no white thin line can be clearly reproduced. As a result, the line width differs between a white thin line of the 1-dot width in the main scanning direction and a white thin line of the 1-dot width in the sub-scanning direction.

Figure 12A:
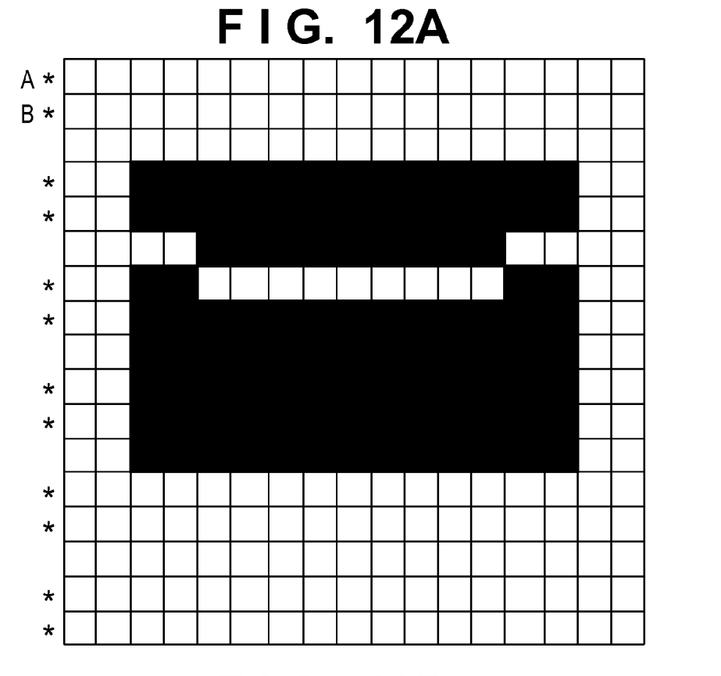
FIGS. 12A and 12B are views for explaining output image data based on the presence/absence of white line emphasis processing.
Figure 12B:
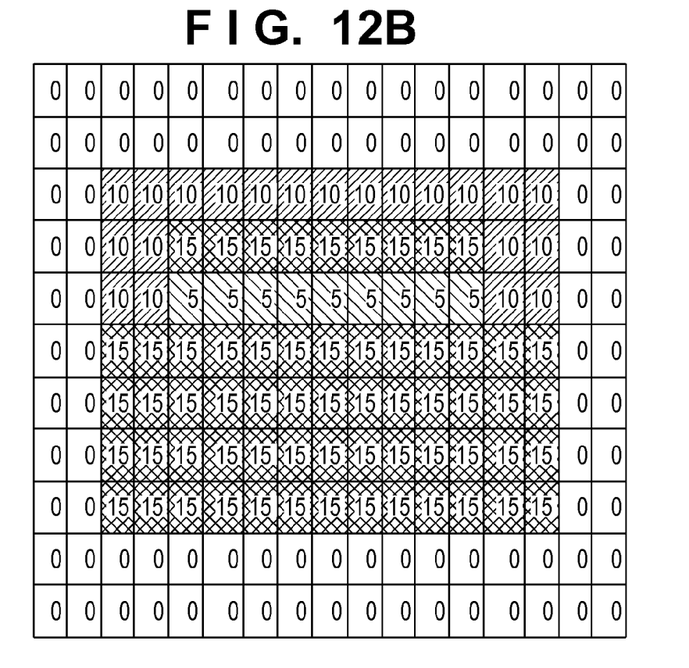

FIG. 12A shows the result of performing white line emphasis processing according to the embodiment for the binary image data in FIG. 11A. The value of a pixel at a non-sampling point is replaced with that of a pixel adjacent in the sub-scanning direction. FIG. 12B shows pixel values as a result of executing resolution conversion processing using the filters shown in FIGS. 5A and 5B for the binary image data in FIG. 12A. A step of the PWM value can be generated, and a white thin line can be reproduced clearly.

Second Embodiment

The first embodiment has explained resolution conversion processing and white thin line emphasis processing in only the sub-scanning direction. However, resolution conversion in both the main scanning direction and sub-scanning direction can also be executed.

The second embodiment will explain resolution conversion from the first image data having the first resolution of 600 dpi into the second image data having the second resolution of 400 dpi. That is, in the embodiment, resolution conversion processing from 600-dpi image data into 400-dpi image data, and white thin line emphasis processing are performed in both main scanning and sub-scanning.

Similar to the first embodiment, first, resolution conversion processing in the sub-scanning direction is executed for the first image data. Resultantly output multi-valued image data is second image data 402. Processing up to this stage is the same as that in the first embodiment, and a description of the processing sequence and operation will not be repeated.

Figure 13:
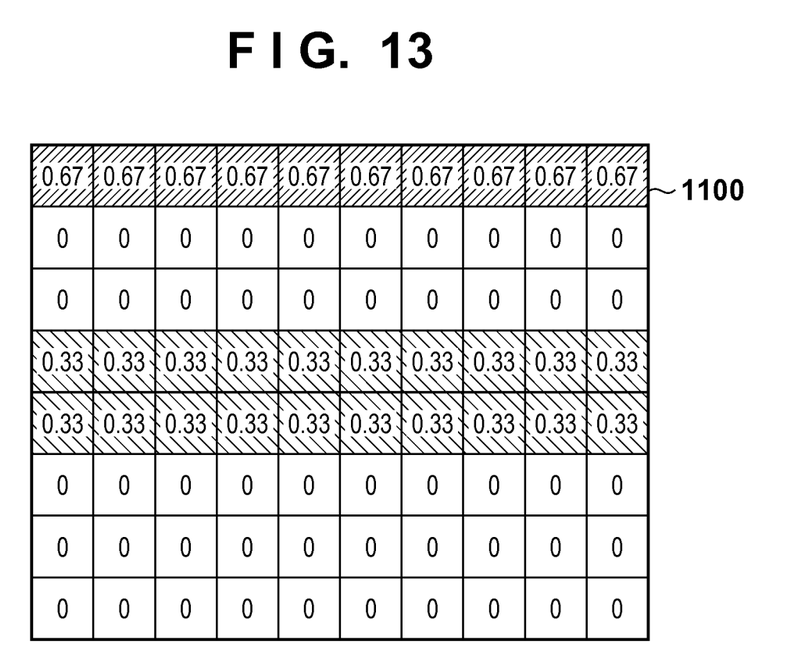
FIG. 13 is a view showing an example in which output multi-valued image data is expressed by numerical values and normalized using 1 as a maximum value.
Figure 14A:
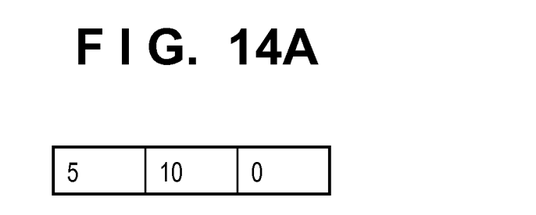
FIGS. 14A and 14B are views showing examples of resolution conversion processing filters in the main scanning direction.
Figure 14B:
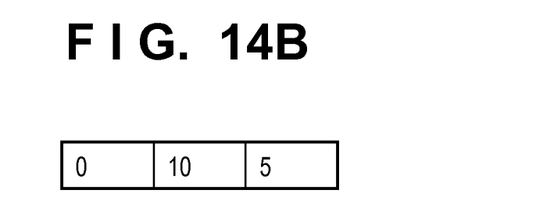

Then, an image processing unit 103 normalizes the output value of the second image data 402 by setting a maximum value of 255 as 1. FIG. 13 shows image data 1100 serving as a normalized image. The image data 1100 is set as the first image data having the first resolution of 600×400 dpi, and resolution conversion in the main scanning direction into the second image data having the second resolution of 400 dpi is performed. Resolution conversion processing filters shown in FIGS. 14A and 14B are filters A and B used to execute resolution conversion in the main scanning direction. These filters are also defined according to the same rule as those of the filters shown in FIGS. 5A and 5B. More specifically, after resolution conversion processing in the sub-scanning direction, resolution conversion in the main scanning direction is performed by the same method using the resolution conversion processing filters shown in FIGS. 14A and 14B.

White thin line processing when performing resolution conversion processing in the main scanning direction is also performed similarly to white thin line processing when performing resolution conversion processing in the sub-scanning direction. More specifically, when performing resolution conversion using the filters A and B, output multi-valued image data after resolution conversion is multiplied at a sampling point by a coefficient for adjusting the PWM intensity. To the contrary, when a white thin line part is determined at a non-sampling point, the value of a pixel of interest in binary image data and the value of a pixel on the next line positioned at (x+1, y) are replaced.

Pixels to be replaced are not limited to the aforementioned positions, and may be decided in accordance with the relationship between adjacent pixels or neighboring pixels. It may also be configured to allow the user to set whether to perform processing of emphasizing a white thin line.

In the above-described fashion, resolution conversion processing from the first image data having the resolution of 600 dpi into the second multi-valued image data having the resolution of 400 dpi, and white thin line emphasis processing are executed.

As described above, in addition to the effects of the first embodiment, the thickness of a stable white thin line can be reproduced in both the main scanning direction and sub-scanning direction.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-032444, filed Feb. 21, 2013, which is hereby incorporated by reference herein in its entirety.

What is claimed is:

1. An image processing apparatus which converts first image data having a first resolution into second image data having a second resolution lower than the first resolution, comprising:
   a decision unit configured to decide, based on the first resolution and the second resolution, a sampling pixel to be used for resolution conversion in the first image data;
   a determination unit configured to determine whether the first image data includes a white line which is not larger than a predetermined width;
   a replacing unit configured to, in a case where the determination unit determines that the first image data includes a white line and a pixel of interest in the first image data is a pixel included in the white line and is not the sampling pixel, replace a value of the pixel of interest with a value of a pixel adjacent to the pixel of interest; and
   a conversion unit configured to convert the first image data including the replaced value of the pixel into the second image data having the second resolution.

2. The apparatus according to claim 1, further comprising a unit configured to, in a case where the determination unit determines that the first image data includes a white line and the pixel of interest is included in the white line and is the sampling pixel, apply, to a value of the pixel of interest in the second image data, a coefficient for adjusting PWM intensity in image output.

3. The apparatus according to claim 1, wherein said determination unit performs matching between a pixel pattern having a size of I×J pixels and the first image data.

4. The apparatus according to claim 3, wherein the pixel pattern has a size of 5×3 pixels.

5. The apparatus according to claim 1, further comprising a correction unit configured to correct a value of a pixel adjacent to the pixel of interest replaced by said replacing unit, to be small in the second image data.

6. The apparatus according to claim 1, wherein
   in performing processing for each line in a main scanning direction, in a case where the determination unit determines that the first image data includes a white line and the pixel of interest is included in the white line and is not the sampling pixel, said replacing unit replaces the value of the pixel of interest with a value of a pixel adjacent to the pixel of interest in a sub-scanning direction, and
   in performing processing for each line in the sub-scanning direction, in a case where the determination unit determines that the first image data includes a white line and the pixel of interest is included in the white line and is not the sampling pixel, said replacing unit replaces the value of the pixel of interest with a value of a pixel adjacent to the pixel of interest in the main scanning direction.

7. The apparatus according to claim 1, wherein a resolution conversion ratio N/M of the first resolution N to the second resolution M is not an integer multiple.

8. An image processing method of converting first image data having a first resolution into second image data having a second resolution lower than the first resolution, comprising:
   deciding using a decision unit, based on the first resolution and the second resolution, a sampling pixel to be used for resolution conversion in the first image data;
   determining using a determination unit, whether the first image data includes a white line which is not larger than a predetermined width;
   replacing using a replacing unit, in a case where it is that the first image data includes a white line in the determining step and a pixel of interest in the first image data is a pixel included in the white line and is not the sampling pixel, a value of the pixel of interest with a value of a pixel adjacent to the pixel of interest; and
   converting using a conversion unit, first image data including the replaced value of the pixel into second image data having the second resolution.

9. A non-transitory computer readable medium storing a program for causing a computer to function as:
   a decision unit configured to, in a case where performing resolution conversion from a first resolution of first image data into second image data having a second resolution lower than the first resolution, decide a sampling pixel in the first image data based on the first resolution and the second resolution;
   a determination unit configured to determine whether the first image data includes a white line of not larger than a predetermined width;
   a replacing unit configured to, in a case where the determination unit determines that the first image data includes a white line and a pixel of interest in the first image data is a pixel included in the white line and is not the sampling pixel, replace a value of the pixel of interest with a value of a pixel adjacent to the pixel of interest; and
   a conversion unit configured to convert first image data including the replaced value of the pixel into second image data having the second resolution.

* * * * *